United States Patent
Nakayama et al.

(10) Patent No.: US 7,841,671 B2
(45) Date of Patent: Nov. 30, 2010

(54) BRAKING DEVICE OF MOTORCYCLE

(75) Inventors: Masanobu Nakayama, Saitama (JP);
Kazuya Takenouchi, Saitama (JP);
Kazuhiko Tani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/311,164

(22) Filed: Dec. 20, 2005

(65) Prior Publication Data

US 2006/0138858 A1   Jun. 29, 2006

(30) Foreign Application Priority Data

| Dec. 22, 2004 | (JP) | ............................. 2004-371218 |
| Dec. 27, 2004 | (JP) | ............................. 2004-375278 |
| Jan. 26, 2005 | (JP) | ............................. 2005-017999 |

(51) Int. Cl.
*B60T 13/00* (2006.01)
*B60T 8/32* (2006.01)

(52) U.S. Cl. ...................... 303/9.64; 303/9.61; 303/137

(58) Field of Classification Search ............... 303/9.64, 303/9.61, 137

See application file for complete search history.

(56) References Cited

U.S. PATENT DOCUMENTS

| 5,219,211 | A | * | 6/1993 | Tsuchida et al. | ........... 303/9.64 |
| 5,297,859 | A | * | 3/1994 | Suzuki et al. | ............... 303/137 |
| 5,324,102 | A | * | 6/1994 | Roll et al. | ................... 303/137 |
| 6,338,533 | B1 | * | 1/2002 | Wakabayashi et al. | ..... 303/9.64 |
| 6,409,285 | B1 | * | 6/2002 | Wakabayashi et al. | ..... 303/9.64 |
| 6,685,278 | B2 | * | 2/2004 | Kusano et al. | ........... 303/113.4 |
| 6,715,848 | B2 | * | 4/2004 | Chen et al. | ................... 303/137 |
| 6,733,089 | B1 | * | 5/2004 | Wakabayashi et al. | ..... 303/9.64 |
| 6,793,295 | B2 | * | 9/2004 | Sakamoto | .................. 303/9.64 |
| 2005/0067892 | A9 | * | 3/2005 | Heubner et al. | .......... 303/113.5 |
| 2005/0168063 | A1 | * | 8/2005 | Tani et al. | ................ 303/113.5 |

FOREIGN PATENT DOCUMENTS

| JP | 4-368267 A | 12/1992 |
| JP | 2000-264278 A | 9/2000 |
| WO | WO-02/24417 A2 | 3/2002 |

* cited by examiner

*Primary Examiner*—Bradley T King
*Assistant Examiner*—Mahbubur Rashid
(74) *Attorney, Agent, or Firm*—Birch, Stewart, Kolasch & Birch, LLP

(57) ABSTRACT

To enhance a brake feel of a motorcycle adopting a combined brake system. In a braking device for adjusting hydraulic pressure supplied to a brake caliper at a rear wheel according to hydraulic pressure at a front wheel produced by a brake operation at the front wheel of a motorcycle, a pattern for adjusting a brake caliper pressure at the rear wheel is different between a case when a temporal increasing rate of master cylinder pressure at the front wheel is equal to or exceeds a predetermined value and a case when the temporal increasing rate is below the predetermined value. Further, to provide a braking device for a motorcycle wherein a variation of a vertical load of a rear wheel when a brake is applied at a front wheel is inhibited.

12 Claims, 9 Drawing Sheets

Fr M/C PRESSURE

BRAKING DEVICE OF MOTORCYCLE

CROSS-REFERENCE TO RELATED APPLICATIONS

The present application claims priority under 35 USC 119 to Japanese Patent Application Nos. 2004-371218 filed on Dec. 22, 2004, Japanese Patent Application Nos. 2004-375278 filed on Dec. 27, 2004 and Japanese Patent Application Nos. 2005-017999 filed on Jan. 26, 2005 the entire contents of which are hereby incorporated by reference.

FIELD OF THE INVENTION

The present invention relates to a braking device of a motorcycle.

DESCRIPTION OF BACKGROUND ART

A braking device for a motorcycle is known wherein a wheel braking means at a rear wheel is interlocked with a brake operation at a front wheel. For example, when a brake lever at the front wheel is operated, braking pressure acts upon a brake caliper at the front wheel via a master cylinder, a part of pressure that acts upon the master cylinder also acts upon a brake caliper at the rear wheel via a proportioning valve, and the side of the rear wheel is braked. See, JP-A No. 368267/1992.

A brake system in which front and rear wheel braking means brake together by applying a brake at one of front and rear wheels will be called a combined brake system (CBS) below.

However, the conventional type CBS in which pressure is supplied to the brake caliper at the rear wheel via the proportioning valve has a problem in that the braking pressure of the front and rear wheels is univocally determined by a characteristic of the proportioning valve, depending upon an input state from the brake lever at the front wheel. The relatively great decrease in a vertical load onto a road surface occurs at the rear wheel because of the specifications of a vehicle and the effect of a coefficient of friction of a road surface and others, compared with that at the front wheel which is not desirable in terms of a brake feel.

Normally, in a braking device for a motorcycle, a master cylinder is provided to a braking member such as a lever and a pedal and wheel braking means such as a brake caliper provided to a wheel are connected via a piping and the wheel braking means is operated by input-output characteristics univocally determined by the size and others of the master cylinder and the wheel braking means. See, for example, JP-A No. 264278/2000.

However, in this type of braking device for a motorcycle, when a large braking force is input to the side of a front wheel, a vertical load of a rear wheel decreases more because of the bite of the front wheel upon a road surface and the inertia force of a vehicle. When the vertical load of the rear wheel varies in braking, a braking feeling may be deteriorated.

SUMMARY AND OBJECTS OF THE INVENTION

It is an object of an embodiment of the invention to provide a braking device for a motorcycle in which a brake feel of the motorcycle adopting a combined brake system is improved.

To solve the problem, according to an embodiment of the invention a braking device is provided for a motorcycle for adjusting hydraulic pressure at a rear wheel to be supplied to a wheel braking means at the rear wheel, for example, a brake caliper 4 at the rear wheel in an embodiment described later, according to hydraulic pressure at a front wheel produced by a braking operation at the front wheel. The hydraulic pressure at the rear wheel is controlled according to a temporal increasing rate of the hydraulic pressure at the front wheel.

As the hydraulic pressure at the rear wheel is controlled according to the temporal increasing rate of the hydraulic pressure at the front wheel by a configuration as described above, the relatively great decrease of a vertical load onto a road surface of the rear wheel can be inhibited.

According to an embodiment of the present invention a value pattern for adjusting the hydraulic pressure at the rear wheel is different between a case where the temporal increasing the rate of the hydraulic pressure at the front wheel to be equal to or to exceed a predetermined value and a case wherein the temporal increase rate is below the predetermined value.

Thereby, as it is estimated that a relatively great decrease of a vertical load onto a road surface of the rear wheel hardly occurs in case where the temporal increasing rate of the hydraulic pressure at the front wheel is below the predetermined value and the relatively great decrease of a vertical load onto a road surface of the rear wheel often occurs in case of the temporal increasing rate that is equal to or exceeds the predetermined value, the relatively great decrease in the vertical load onto the road surface of the rear wheel can be inhibited by changing the patterns for adjusting the hydraulic pressure at the rear wheel with the predetermined value as a borderline.

According to an embodiment of the present invention a pattern for adjusting the hydraulic pressure at the rear wheel in the case where the increase in the rate is equal to or exceeds the predetermined value is set according to elapsed time since the increasing rate reaches the predetermined value. At first the hydraulic pressure at the rear wheel abruptly increases and thereafter becomes substantially fixed and gradually decreases.

Hydraulic pressure supplied to wheel braking means at the rear wheel can be abruptly increased in time for the abrupt increase of hydraulic pressure at the front wheel by the configuration as described above. As a result, a large braking force can be produced at the rear wheel in time for the increase of braking force at the front wheel. As the suspension at the rear wheel can be made to go down by braking at the rear wheel, the relatively great decrease of a vertical load onto a road surface of the rear wheel by braking at the front wheel can be inhibited.

According to an embodiment of the present invention the pressure sensing means is provided, for example, a pressure sensor of a front wheel 28 in the embodiment described later, for sensing hydraulic pressure at the front wheel produced by the braking operation at the front wheel, together with a pressure sensing means, for example, a pressure sensor means, for example, a pressure sensor at the front wheel 29 in the embodiment described later, for sensing hydraulic pressure supplied to wheel braking means at the front wheel, for example, a brake caliper at the front wheel 4 in the embodiment described late and a pressure sensing means, for example, a pressure sensor at the rear wheel 29, for sensing hydraulic pressure supplied to wheel braking means at the rear wheel, for example, a brake caliper at the rear wheel 4 in the embodiment described later.

The allocation of hydraulic pressure supplied to the wheel braking means at the front wheel and hydraulic pressure supplied to the wheel braking means at the rear wheel can be suitably controlled based upon a value sensed by each pressure sensing means by the configuration as described above. This is particularly effective in the case of a brake-by-wire type device in which brake mechanisms of front and rear wheels are independent.

According to an embodiment of the present invention for the pattern for adjusting hydraulic pressure, in the case wherein a temporal increasing rate of hydraulic pressure at the front wheel is equal to or exceeds a predetermined value, a larger hydraulic pressure is set than the hydraulic pressure at the rear wheel set in case the temporal increasing rate is below the predetermined value.

In case the wherein a temporal increasing rate of the hydraulic pressure at the front wheel is equal to or exceeds the predetermined value, the hydraulic pressure at the rear wheel can be increased by the configuration as described above, compared with the case wherein the temporal increasing rate is below the predetermined value.

According to an embodiment of the present invention the pattern for adjusting the hydraulic pressure is set based upon a hydraulic pressure map for the hydraulic pressure at the front wheel. In addition, a hydraulic pressure map in the case wherein a temporal increasing rate of hydraulic pressure at the front wheel is below the predetermined value is set so that brake caliper pressure at the rear wheel increases in a region in which hydraulic pressure at the front wheel is small and becomes fixed in a region in which the hydraulic pressure is in the middle and gradually decreases in a region in which the hydraulic pressure is large.

When the temporal increasing rage of hydraulic pressure at the front wheel is below the predetermined value, a braking force at the rear wheel can be increased according to the increase in hydraulic pressure at the front wheel by the configuration as described above and the occurrence of a slip at the rear wheel can be inhibited in the region in which the hydraulic pressure at the front wheel is large.

According to an embodiment of the present invention a hydraulic pressure map is set in the case wherein a temporal increasing rate of hydraulic pressure at the front wheel is equal to or exceeds the predetermined value.

In case wherein the temporal increasing rate of the hydraulic pressure at the front wheel is equal to or exceeds the predetermined value, hydraulic pressure at the rear wheel can be increased by the configuration as described above, as compared with the case wherein the temporal increasing rate is below the predetermined value.

According to an embodiment of the present invention a hydraulic pressure value retrieved based upon the hydraulic pressure map gradually decreases after a predetermined time elapses.

After a relatively great decrease of a vertical load onto a road surface of the rear wheel by braking at the front wheel is inhibited, hydraulic pressure at the rear wheel can be decreased by the configuration as described above.

According to an embodiment of the present invention a map value in the case wherein a temporal increasing rate of hydraulic pressure at the front wheel is equal to or exceeds the predetermined value and a map value in the case wherein the temporal increasing rate is below the predetermined value are compared and the larger map value is set as a hydraulic pressure value at the rear wheel.

After a relatively great decrease of a vertical load onto a road surface of the rear wheel when the braking at the front wheel is inhibited, the brake caliper pressure at the rear wheel can be returned to that in the pattern for adjusting hydraulic pressure in case wherein the temporal increasing rate of hydraulic pressure at the front wheel is below the predetermined value by configuring as described above.

According to an embodiment of the present invention, as hydraulic pressure at the rear wheel is controlled according to the temporal increasing rate of hydraulic pressure at the front wheel, the relatively great decrease of a vertical load onto a road surface of the rear wheel can be inhibited and a brake feel is enhanced.

According to an embodiment of the present invention, as it is estimated that a relatively great decrease of a vertical load onto a road surface of the rear wheel hardly occurs in case wherein the temporal increasing rate of hydraulic pressure at the front wheel is below the predetermined value and the relatively great decrease of a vertical load onto a road surface of the rear wheel often occurs in case wherein the temporal increasing rate is equal to or exceeds the predetermined value, the relatively great decrease of the vertical load onto the road surface of the rear wheel can be inhibited by the changing patterns for adjusting hydraulic pressure at the rear wheel with the predetermined value as a borderline. Thus, a braking feel is enhanced.

According to an embodiment of the present invention, the relatively great decrease in a vertical load onto a road surface of the rear wheel by braking at the front wheel can be inhibited. Thus, a braking feel is enhanced.

According to an embodiment of the present invention, the allocation of hydraulic pressure supplied to the wheel braking means at the front wheel and hydraulic pressure supplied to the wheel braking means at the rear wheel can be suitably controlled based upon a value sensed by each pressure sensing means. This is particularly effective in a case of a brake-by-wire type in which the brake mechanisms of front and rear wheels are independent.

According to an embodiment of the present invention, as hydraulic pressure at the rear wheel can be increased, compared with that in case wherein the temporal increasing rate of hydraulic pressure at the front wheel is below the predetermined value and in case wherein the temporal increasing rate is equal to or exceeds the predetermined value, the relatively great decrease of a vertical load onto a road surface of the rear wheel can be securely inhibited.

According to an embodiment of the present invention, when the temporal increasing rate of hydraulic pressure at the front wheel is below the predetermined value, a braking force at the rear wheel can be increased according to the increase of the hydraulic pressure at the front wheel and the occurrence of a slip at the rear wheel can be inhibited in the region in which the hydraulic pressure at the front wheel is large.

According to an embodiment of the present invention, as hydraulic pressure at the rear wheel can be increased, compared with that in case wherein the temporal increasing rate of hydraulic pressure at the front wheel is below the predetermined value and in case wherein the temporal increasing rate is equal to or exceeds the predetermined value, the relatively great decrease of a vertical load onto a road surface of the rear wheel can be securely inhibited.

According to an embodiment of the present invention, after a relatively great decrease in a vertical load onto a road surface of the rear wheel by braking at the front wheel is inhibited, hydraulic pressure at the rear wheel can be decreased.

According to an embodiment of the present invention, after the relatively great decrease of a vertical load onto a road surface of the rear wheel by braking at the front wheel is inhibited, the brake caliper pressure at the rear wheel can be returned to that wherein the pattern for adjusting hydraulic pressure in case the temporal increasing rate of hydraulic pressure at the front wheel is below the predetermined value.

It is an object of the present invention to provide a braking device of a motorcycle wherein the variation of a vertical load of a rear wheel in braking at a front wheel is promptly inhibited and a braking feeling can be enhanced.

To achieve this object, according to an embodiment of the present invention, a braking device of a motorcycle is provided with an input state detecting means, for example, a brake caliper 4 in an embodiment described later, for detecting the behavior of a braking member, for example, a braking member 2 in the embodiment described later, at a front wheel and a hydraulic pressure modulator, for example, a hydraulic pressure modulator 6 in the embodiment described later, for producing hydraulic pressure according to a detection signal of the input state detecting means and applying the hydraulic pressure to wheel braking means at the front wheel. A full braking judging means, for example, a controller 20, a pressure sensor on the input side 28 and a pressure sensor on the output side 29 in the embodiment described later, is provided for judging whether a rider applies a full braking at the front wheel or not based upon the behavior of the braking member at the front wheel. The full braking judging means increases the hydraulic pressure produced by the hydraulic pressure modulator according to a detection signal of the input state detecting means when the full braking judging means judges that full braking is applied and changes a pressure intensification characteristic of the wheel braking means at the front wheel.

In this case, when the braking member at the front wheel is operated in braking, the behavior is detected by the input state detecting means. The hydraulic pressure modulator produces hydraulic pressure according to a signal detected by the input state detecting means and applies the hydraulic pressure to the wheel braking means at the front wheel. Thus, the wheel braking means is controlled by a so-called brake-by-wire method. When full braking is applied at the front wheel, the level of a pressure intensification characteristic of hydraulic pressure produced by the hydraulic pressure modulator according to a detection signal of the input state detecting means is changed to a higher level and the rise of the hydraulic pressure of the wheel braking means by brakes operation is accelerated.

Thus, a minute slip is generated on the front wheel, the great decrease at a rear wheel of a vertical load is temporarily held back, and a further lift at the rear wheel is prevented.

According to an embodiment of the present invention a master cylinder, for example, a master cylinder 3 in the embodiment described later, is provided for producing hydraulic pressure according to a manipulated variable of the braking member. In addition, a pressure sensor on the input side, for example, the pressure sensor on the input side 28 in the embodiment described later, is provided for sensing the hydraulic pressure of the master cylinder together with a pressure sensor on the output side, for example, the pressure sensor on the output side 29 in the embodiment described later, for sensing the hydraulic pressure of the wheel braking means at the front wheel. In braking, feedback control is applied to the hydraulic pressure of the hydraulic pressure modulator based upon signals from the pressure sensor on the input side and the pressure sensor on the output side and the full braking judging means judges whether full braking is applied or not based upon the rate of change of a master cylinder pressure acquired based upon a value sensed by the pressure sensor on the input side and a value sensed by the pressure sensor on the output side.

In this case, in braking, the rider's intention with regard to operation is judged based upon the value sensed by the pressure sensor on the input side, a value sensed by the pressure sensor on the output side is fed back, and the wheel braking means is controlled so that the rider's intention with regard to operation is precisely reflected. The full braking judging means calculates the rate of a change in pressure in the master cylinder based upon a value sensed by the pressure sensor on the input side and judges whether the master cylinder pressure abruptly rises or not based upon the result.

According to an embodiment of the present invention hydraulic pressure applied to the wheel braking means at the front wheel from the hydraulic pressure modulator is electrically controlled based upon a detection signal of the input state detecting means.

According to an embodiment of the present invention a state of slip of the front wheel is detected and the wheel braking means at the front wheel is controlled by ABS.

In this case, when the level of a pressure intensification characteristic of the wheel braking means is changed to a higher level and the rise of the hydraulic pressure of the wheel braking means is accelerated in full braking at the front wheel, a slip occurs on the front wheel in an early stage and an antilock brake control is started depending upon the situation.

According to an embodiment of the present invention, as a slip is made on the front wheel by abruptly changing the braking pressure of the wheel braking means at the front wheel in a full braking at the front wheel, thereby, a great decrease of a vertical load at the rear wheel is temporarily held back and a further decrease of the vertical load of the rear wheel can be prevented. Thus, a stable braking feeling can be secured.

In addition, according to an embodiment of the present invention, when the pressure sensor on the input side for sensing the hydraulic pressure of the master cylinder and the pressure sensor on the output side for sensing the hydraulic pressure of the wheel braking means at the front wheel are provided, feedback control in braking can be precisely made. Further, feedback control can be precisely judged utilizing these sensors whether full braking is applied or not.

According to an embodiment of the present invention, as hydraulic pressure applied to the wheel braking means at the front wheel is electrically controlled based upon a detection signal of the input state detecting means, hydraulic pressure that acts at the front wheel can be promptly and precisely controlled according to brakes operation.

According to an embodiment of the present invention, when a slip occurs on the front wheel in braking at the front wheel, the slip itself can inhibit the decrease of a vertical load of the rear wheel, depending upon a situation, control by ABS is started, and the deterioration of braking performance can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
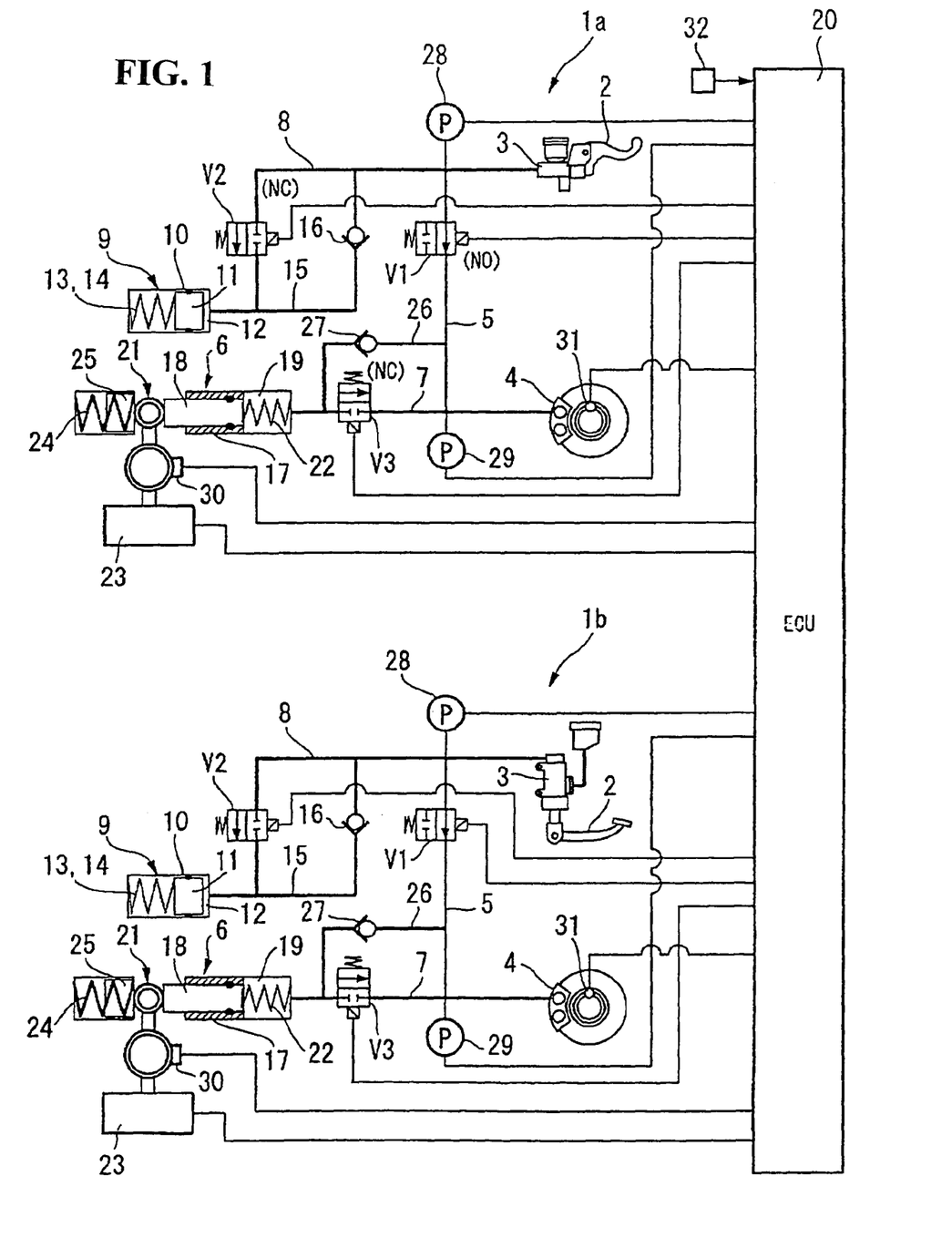
FIG. 1 shows a hydraulic pressure circuit of a braking device of a motorcycle equivalent to an embodiment of the invention.

FIG. 1 shows a hydraulic pressure circuit of a braking device of a motorcycle equivalent to one embodiment of the invention. As shown in FIG. 1, in the braking device equivalent to this embodiment, a braking circuit 1a at a front wheel and a braking circuit 1b at a rear wheel respectively independent are linked via a controller (ECU) 20.

A braking operation is executed by a brake lever which is a braking member 2 in the braking circuit 1a at the front wheel and is executed by a brake pedal which is the braking member 2 in the braking circuit 1b at the rear wheel. However, as illustrated the configuration for the brake lever of the braking circuit 1a at the front wheel and the configuration for the brake pedal of the braking circuit 1b at the rear wheel are substantially similar. Only the configuration of the braking circuit 1a at the front wheel will be described in detail below with the same reference numeral being allocated to the same parts in the braking circuit 1b at the rear wheel as that in the braking circuit 1a at the front wheel. A duplicate description is omitted.

In this braking device, a brake-by-wire method is adopted in both the front wheel and the rear wheel with a manipulated variable (hydraulic pressure in this embodiment) of the braking member being such that the brake lever is electrically detected. Thus, the braking force is generated by hydraulic pressure produced by a hydraulic pressure modulator based upon a detected value.

In addition, in this braking device, a combined brake system (hereinafter called CBS) in which front and rear wheel braking means are interlocked and braking is executed by braking the side of one of the front and rear wheels is adopted.

In the braking circuit on the side on which the braking member 2 is operated earlier, hydraulic pressure operated by the hydraulic pressure modulator based upon the hydraulic pressure of the master cylinder acts upon the brake caliper on the side operated earlier according to the brake-by-wire method and in the braking circuit on the side operated later, hydraulic pressure operated by the hydraulic pressure modulator based upon the hydraulic pressure of the master cylinder in the braking circuit on the side operated earlier also acts upon the brake caliper according to the brake-by-wire method.

Further, in this braking device, an antilock brake system (hereinafter called ABS) for controlling the slip ratio of a wheel by braking operation in braking is adopted.

In each braking circuit 1a, 1b, the master cylinder 3 interlocked with the braking member 2 and the brake caliper 4 corresponding to the master cylinder 3 are connected via a main brake pipe 5. The hydraulic pressure modulator 6 described later is connected via a supply/drainage pipe 7 via the main brake pipe 5.

A first electromagnetic valve V1 of a normally open (NO) type for making the master cylinder 3 and the brake caliper 4 communicate or disconnecting them is inserted on the side of the master cylinder 3 a distant from a connection to the supply/drainage pipe 7 on the main brake pipe 5 and a branch pipe 8 is connected to the main brake pipe. A hydraulic loss simulator 9 for making pseudo hydraulic pressure reaction force according to a manipulated variable of the braking member 2 that acts upon the master cylinder 3 when the first electromagnetic valve V1 closes the main brake pipe 5 is connected to the branch pipe 8 via a second electromagnetic valve V2 of a normally closed (NC) type. The second electromagnetic valve V2 opens the branch pipe 8 when the reaction force is applied and permits communication between the side of the master cylinder 3 and the hydraulic loss simulator 9.

As for the hydraulic loss simulator 9, a piston 11 is housed in a cylinder 10 so that the piston can advance and step back. A hydraulic chamber 12 for reserving hydraulic fluid flowing from the side of the master cylinder 3 is formed between the cylinder 10 and the piston 11. A coil spring 13 and a resin spring 14 respectively that different in a characteristic are arranged in series on the back side of the piston 11, and the reaction force having the characteristics that the buildup is gentle to the piston 11 (the braking member 2) and the buildup that is abrupt at the end of a stroke is applied by these two coil spring 13 and resin spring 14.

A bypass pipe 15 is provided for bypassing the second electromagnetic valve V2 to the branch pipe 8 and a check valve 16 is provided for allowing the flow of hydraulic fluid in a direction of the master cylinder 3 from the side of the hydraulic loss simulator 9 to the bypass pipe 15.

The hydraulic pressure modulator 6 is provided with a cam mechanism 21 for pressing a piston 18 provided in a cylinder 17 in a direction of a hydraulic pressure chamber 19 formed between the cylinder 17 and the piston 18. A return spring 22 is provided for constantly pressing the piston 18 on the side of the cam mechanism 21 and an electric motor 23 for operating the cam mechanism 21. The hydraulic pressure chamber 19 is made to communicate with the supply/drainage pipe 7. The hydraulic pressure modulator 6 increases or decreases pressure in the hydraulic pressure chamber 19 by pressing the piston 18 via the cam mechanism 21 by the electric motor 23 with the initial position in the cylinder 17 as a criterion and returns the piston 18 by the return spring 22 so as to enable an increasing or decreasing of the braking pressure of the brake caliper 4.

In this case, the electric motor 23 adjusts the position of the piston 18 that is determined by the rotational position of the cam mechanism 21 that is electrically precise and simple by adjusting a current value determined by an input duty ratio (turn-on time/turn-on time+turn-off time) by PWM control and adjusts pressure in the hydraulic pressure chamber 19.

A lifter 25 the stroke of which is regulated by a stopper not shown via a backup spring 24 is arranged in the cam mechanism 21 so that the lifter can advance and step back and the piston 18 is constantly pressed by the lifter 25 in a direction in which the hydraulic pressure chamber 19 is reduced. Thus, in the case where the electric motor 23 is not energized, the lifter 25 is pressed by the backup spring 24, and is stopped by the stopper, and returns the piston 18 to the initial position. Therefore, CBS control for positively supplying hydraulic fluid to the main brake pipe 5 (the brake caliper 4) and for control by ABS for stepping back and advancing the piston 18, for again reducing, holding and increasing the pressure in the hydraulic pressure chamber 19 can be made.

A third electromagnetic valve V3 of a normally closed (NC) type is inserted into the supply/drainage pipe 7. A bypass pipe 26 for bypassing the third electromagnetic valve V3 is provided to the supply/drainage pipe 7 and a check valve 27 for allowing the flow of hydraulic fluid in a direction of the brake caliper 4 from the side of the hydraulic pressure modulator 6 is provided to the bypass pipe 26.

In this case, a pressure sensor (P) 28 is provided to the input side which is the side of the master cylinder 3 with the first electromagnetic valve V1 between the pressure sensors in the braking circuit 1a at the front wheel. A pressure sensor (P) 29 is provided to the output side which is the side of the brake caliper 4 in the braking circuit 1b at the rear wheel. An angle sensor 30 for angular information feedback is provided to a cam shaft not shown of the cam mechanism 21. A wheel speed sensor 31 is provided for sensing wheel speed to the brake caliper 4. In addition, a mode change-over switch 32 for switching a control mode by manual operation by a rider is provided and in case the rider desires CBS control, he/she switches the change-over switch 32. A situation wherein the CBS control is selected will be described below.

The controller 20 controls the opening and closing of the first electromagnetic valve V1, the second electromagnetic valve V2 and the third electromagnetic valve V3 based upon signals sensed by the pressure sensors 28, 29. A signal is sensed by the angle sensor 30 and a signal is sensed by the wheel speed sensor 31 for controlling the driving of the electric motor 23.

More specifically, when one braking member 2 is operated, the speed of the front and rear wheels at that time is input to the controller 20 from the wheel speed sensor 31 and the information of a brake manipulated variable and other information is also input to the controller via the pressure sensor 28. The first electromagnetic valves V1 in both braking circuits are maintained in a direction in which the main brake pipes 5 are closed according to an instruction from the controller 20 at this time. At the same time, the electromagnetic valves V2, V3 are maintained in a direction in which they are opened with both hydraulic pressure modulators 6 supplying hydraulic pressure according to a vehicle operating condition and braking operation to each brake caliper 4.

The controller 20 sets a higher wheel speed of the wheel speeds sensed by the wheel speed sensor 31 at the front wheel and the wheel speed sensor 31 at the rear wheel as estimated by the wheel speed vr of the vehicle and further, calculates a front wheel slip ratio or rear wheel slip ratio based upon the difference between the estimated wheel speed vr and the wheel speed of the front wheel or the rear wheel. In the case where the front wheel slip ratio or the rear wheel slip ratio exceeds a threshold of preset slip ratio, the controller determines that a slip occurs in the wheel and starts to operate a control by the ABS in which the hydraulic pressure of the hydraulic pressure modulator 6 is reduced.

According to the above-mentioned configuration, in the case where the vehicle stops (wheel speed=0), the first electromagnetic valve V1 is open, the second electromagnetic valve V2 is closed, and the third electromagnetic valve V3 is closed in the braking circuit 1a at the front wheel and in the braking circuit 1b at the rear wheel as shown in FIG. 1. Therefore, each electromagnetic valve V1, V2, V3 require no power.

Figure 2:
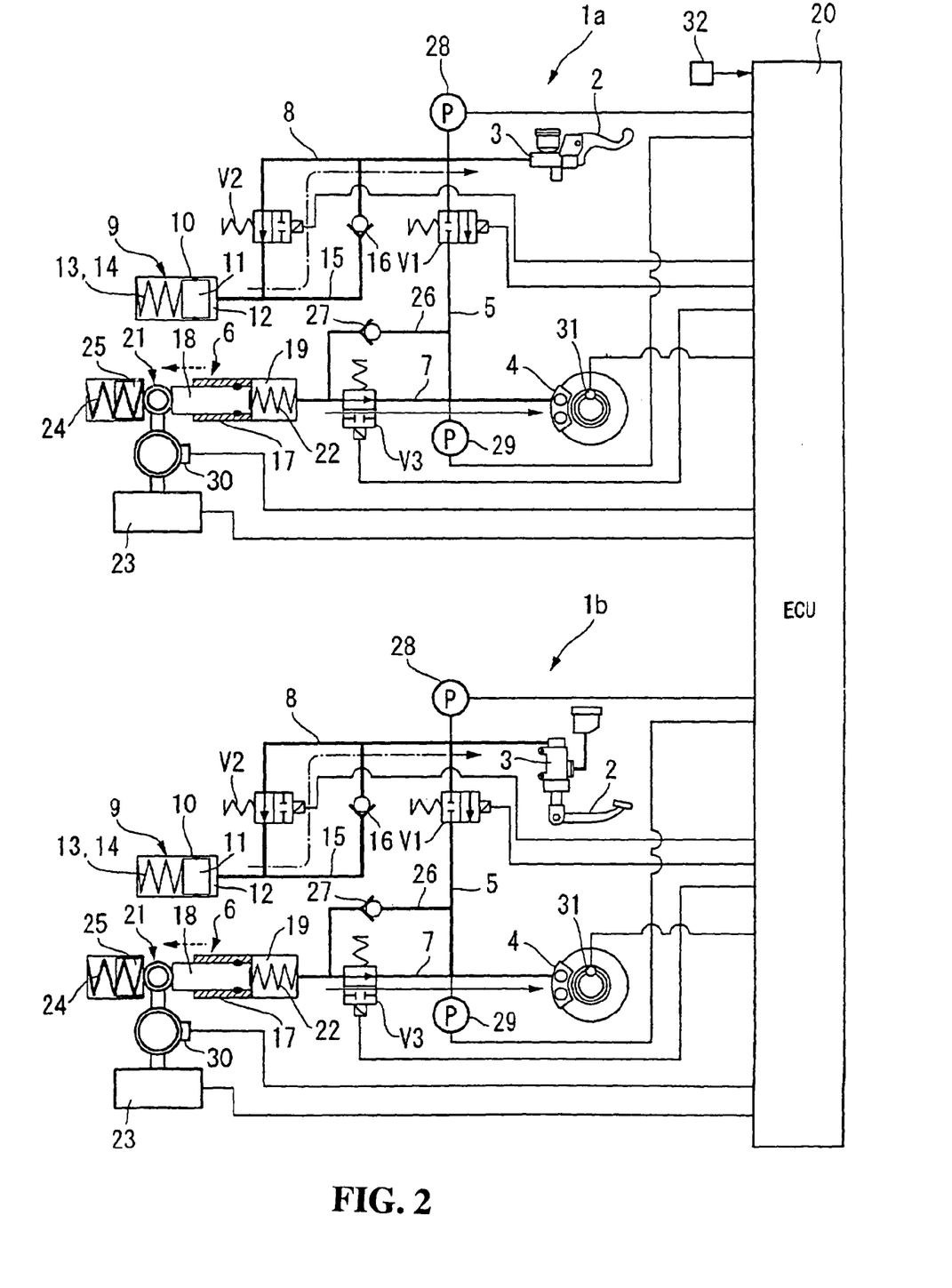
FIG. 2 shows the hydraulic pressure circuit shown in FIG. 1 in braking and when the front wheel ABS is operated.

When the rider operates the brake lever which is the braking member 2 at the front wheel while the vehicle is operated, the first electromagnetic valve V1 is closed, the second electromagnetic valve V2 and the third electromagnetic valve V3 are opened in the braking circuit 1a at the front wheel as shown in FIG. 2. Therefore, the main brake pipe 5 is disconnected from the master cylinder 3 by the closure of the first electromagnetic valve V1. At the same time, the branch pipe 8 and the main brake pipe 5 connect the master cylinder 3 and the hydraulic loss simulator 9 by the opening of the second electromagnetic valve V2. Further, the supply/drainage pipe 7 and the main brake pipe 5 connect the hydraulic pressure modulator 6 and the brake caliper 4 by the opening of the third electromagnetic valve V3.

In the meantime, in the braking circuit 1b at the rear wheel, the first electromagnetic valve V1 is also simultaneously closed, and the second electromagnetic valve V2 and the third electromagnetic valve V3 are also simultaneously opened. Therefore, the main brake pipe 5 is disconnected from the master cylinder 3 by the closure of the first electromagnetic valve V1, at the same time. In addition, the branch pipe 8 and the main brake pipe 5 connect the master cylinder 3 and the hydraulic loss simulator 9 by the opening of the second electromagnetic valve V2. Further, the supply/drainage pipe 7 and the main brake pipe 5 connect the hydraulic pressure modulator 6 and the brake caliper 4 by the opening of the third electromagnetic valve V3.

Thus, on the sides of the front and rear wheels, the rider can have brakes operation with a feeling artificially rendered by the hydraulic loss simulator 9 in the braking circuits 1a, 1b on the sides of the front and rear wheels (see arrows made of a chain line shown in FIG. 2) and at the same time, the variation of hydraulic pressure by the operation of the hydraulic pressure modulator 6 is not transmitted to the side of the rider because the first electromagnetic valve V1 is closed. In addition, at this time, as the electric motor 23 of the hydraulic pressure modulator 6 is operated in parallel with this and the piston 18 is pressed by the cam mechanism 21, hydraulic fluid in the hydraulic pressure chamber 19 is pressurized. Thus, hydraulic pressure according to the control of the electric motor 23 is supplied to the brake caliper 4 via the main brake pipe 5 (see arrows made of a full line shown in FIG. 2).

In case it is sensed by the wheel speed sensor 31 that the slip ratio of the front wheel or the rear wheel (for example, the front wheel in FIG. 2) exceeds a predetermined value, the controller 20 controls the electric motor 23 so as to back the piston 18 (shown by an arrow made of a broken line in FIG. 2) for reducing the braking pressure of the brake caliper 4, and suitably for controlling the slip ratio of the wheel by control by ABS.

At this time, the first electromagnetic valve V1 is closed, the communication of the master cylinder 3 and the hydraulic pressure modulator 6 is cut off. Thus, the variation of pressure in control by ABS is not transmitted to the braking member 2 for the rider.

In the case when the braking member 2 is operated, the vehicle is stopped without operating the ABS is described above. However, the invention can also similarly control a case wherein the ABS is operated and the vehicle is stopped. That is, as it cannot be specified depending upon when the vehicle stops which of pressure on the side of the master cylinder 3 and pressure on the side of the brake caliper 4 is larger because the ABS reduces, holds and increases the pressure in the hydraulic pressure chamber 19 again in case when the ABS is operated, a position of the piston 18 determined by the rotational position of the cam mechanism 21 can be freely adjusted electrically precisely and simply by controlling. This including the normal rotation and the reverse rotation of the electric motor 23 by the PWM control and adjusts a current value determined by input duty ratio independent of increasing or decreasing the pressure in the adjustment.

In the CBS control, each brake caliper pressure on the sides of the front and rear wheels is controlled so that it has a predetermined allocation. However, in this braking device, to prevent the relatively great decrease of a vertical load onto a road surface of the rear wheel in a CBS control from being caused, a pattern for adjusting the hydraulic pressure of the brake caliper 4 at the rear wheel is changed according to a temporal increasing rate (hereinafter merely called an increasing rate) based on the hydraulic pressure of the master cylinder 3 (master cylinder pressure) at the front wheel being changed. The temporal increasing rate of hydraulic pressure is equivalent to increasing the speed of the hydraulic pressure.

To explain the relation between an increasing rate of the master cylinder pressure at the front wheel and the decrease of a vertical load onto a road surface at the rear wheel, as the rise of brake caliper pressure at the front wheel is also gentle when the increasing rate of master cylinder pressure at the front wheel is small, the relatively great decrease of a vertical load onto a road surface of the rear wheel hardly occurs. In the meantime, as the rise of brake caliper pressure at the front wheel is also abrupt when the increasing rate of master cylinder pressure at the front wheel is large, the relatively great decrease of a vertical load onto a road surface of the rear wheel often occurs.

Then, in the braking device equivalent to this embodiment, in case the increasing rate of master cylinder pressure at the front wheel is below a predetermined value, a first hydraulic pressure adjustment pattern, or control scheme, for setting a desired pressure of the brake caliper 4 at the rear wheel based upon the master cylinder pressure at the front wheel is selected. In the case when the increasing rate of master cylinder pressure at the front wheel is equal to or exceeds the predetermined value, a second hydraulic pressure adjustment pattern, or control scheme, for setting the desired pressure of the brake caliper 4 at the rear wheel according to elapsed time since the increasing rate reaches the predetermined value is selected.

Figure 3A:
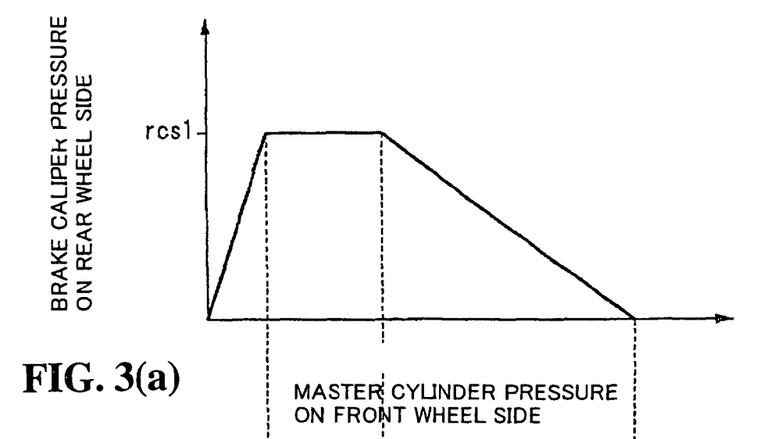
FIG. 3(a) shows one example of a hydraulic pressure adjustment map in normal braking in the embodiment and FIG. 3(b) shows one example of a hydraulic pressure adjustment map in full braking.

FIG. 3(a) shows one example of a hydraulic pressure adjustment map for realizing the first hydraulic pressure adjustment pattern (hereinafter called a hydraulic pressure adjustment map in normal braking). This hydraulic pressure adjustment map in normal braking is set so that it has characteristics that as master cylinder pressure at the front wheel (an axis of an abscissa) increases, a brake caliper pressure at the rear wheel (an axis of an ordinate) gradually increases. When the master cylinder pressure at the front wheel reaches a predetermined value, the brake caliper pressure at the rear wheel becomes fixed at an upper limit rcs1 (for example, 0.5 to 0.8 MPa). Afterward, even if the master cylinder pressure at the front wheel increases, the brake caliper pressure at the rear wheel decreases. In the first hydraulic pressure adjustment pattern, the braking force at the rear wheel can be increased according to the increase of master cylinder pressure at the front wheel. In a region in which the master cylinder pressure at the front wheel is large, the occurrence of a slip at the rear wheel can be inhibited.

Figure 3B:
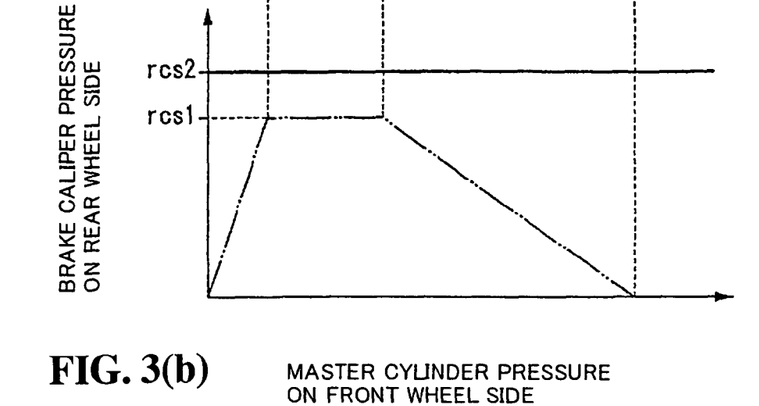

FIG. 3(b) shows one example of a hydraulic pressure adjustment map for realizing the second hydraulic pressure adjustment pattern (hereinafter called a hydraulic pressure adjustment map in full braking). In this hydraulic pressure adjustment map in full braking, independent of the magnitude of master cylinder pressure at the front wheel, a brake caliper pressure at the rear wheel (an axis of an ordinate) is set to a fixed value rcs2 (for example, 0.8 to 1.5 MPa). The brake caliper pressure upper limit rcs2 at the rear wheel in the hydraulic pressure adjustment map in full braking is set to be a larger pressure than the brake caliper pressure upper limit rcs1 at the rear wheel in the hydraulic pressure adjustment map during normal braking.

Next, referring to a flowchart shown in FIG. 5, a process for setting a brake caliper desired pressure at the rear wheel will be described.

Figure 5:
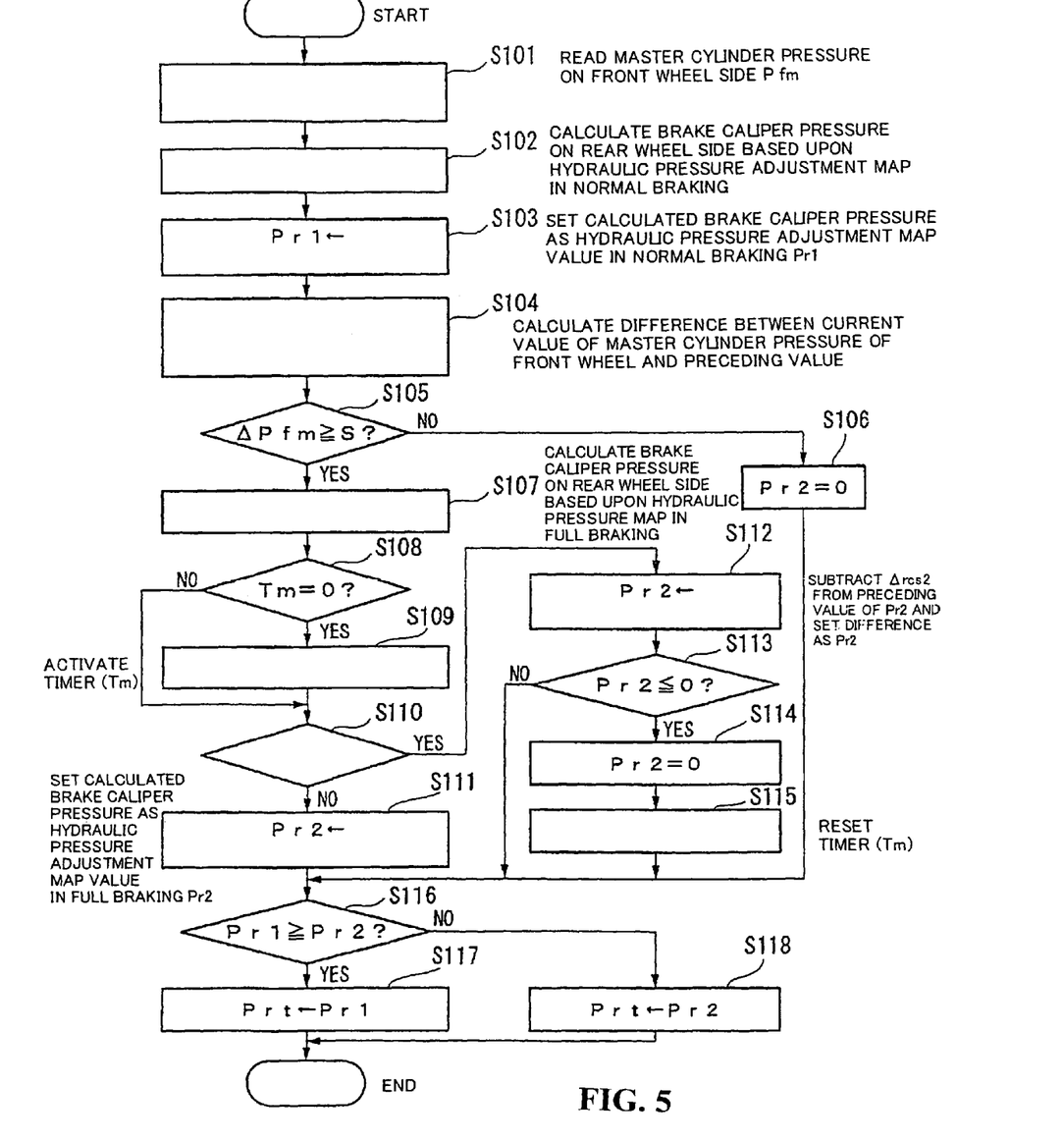
FIG. 5 is a flowchart showing a brake caliper desired pressure setting process at a rear wheel in the embodiment.

A rear-wheel brake caliper desired pressure setting process routine shown in the flowchart in FIG. 5 is repeatedly executed by the controller 20.

First, in a step S101, a value sensed by the pressure sensor on the input side 28 in the braking circuit 1a at the front wheel (that is, the master cylinder pressure at the front wheel) Pfm is read.

Next, in a step S102, brake caliper pressure at the rear wheel according to the master cylinder pressure at the front wheel is calculated based upon the hydraulic pressure adjustment map in a normal braking shown in FIG. 3(a). Further, in a step S103, the brake caliper pressure at the rear wheel calculated in the step S102 is set as a brake caliper pressure at the rear wheel in normal braking Pr1.

Next, in a step S104, a difference (hereinafter called a master cylinder pressure increasing amount) $\Delta Pfm$ between the current value Pfm by the pressure sensor on the input side 28 and the preceding value $Pfm_{-n}$ is calculated ($\Delta Pfm = Pfm - Pfm_{-n}$). In this case, the preceding value $Pfm_{-n}$ sensed by the pressure sensor on the input side 28 may be also a value $Pfm_{-1}$ (that is, the preceding sensed value) read when this control routine is precedently executed and sensed by the pressure sensor on the input side 28, may be also a further precedently sensed value $Pfm_{-2}$, and may be also a furthermore precedently sensed value $Pfm_{-3}$. The master cylinder pressure increasing amount $\Delta Pfm$ corresponds to the increasing rate of master cylinder pressure at the front wheel.

Next, in a step S105, it is determined whether the master cylinder pressure increasing amount $\Delta Pfm$ is equal to or exceeds a predetermined value S or not. The predetermined value S is a positive value.

As the increasing rate of master cylinder pressure at the front wheel is smaller than the predetermined value in case the result of the determination in the step S105 is "NO" ($\Delta Pfm < S$), the process proceeds to a step S106. After the brake caliper pressure at the rear wheel in the full braking Pr2 described later is reset and the process proceeds to a step S116.

In the meantime, as the increasing rate of the master cylinder pressure at the front wheel is larger than the predetermined value in the case where the result of the determination in the step S105 is "YES" ($\Delta Pfm \geq S$), the process proceeds to a step S107 and the brake caliper pressure at the rear wheel according to the master cylinder pressure at the front wheel is calculated based upon the hydraulic pressure adjustment map in a full braking shown in FIG. 3B. In this embodiment, independent of the magnitude of master cylinder pressure at the front wheel, brake caliper pressure at the rear wheel in a full braking has a fixed value rcs2.

Further, in a step S108, it is determined whether a value of a timer Tm is zero or not, in the case where the result of the determination is "YES" (Tm=0), the process proceeds to a step S109, after the timer is activated, the process proceeds to a step S110, in case the result of the determination is "NO" (Tm≠0), the process directly proceeds to the step S110, and it is determined whether a value of the timer Tm is larger than a predetermined time t1 (for example, 0.5 second) or not.

In the case where the result of the determination in the step S110 is "NO" (Tm<t1), the process proceeds to a step S111 and after the brake caliper pressure at the rear wheel calculated in the step S107 is set as the brake caliper pressure at the rear wheel in full braking Pr2, the process proceeds to a step S116.

In the meantime, in case the result of the determination in the step S110 is "YES" (Tm≧t1), the process proceeds to a step S112 and the difference acquired by subtracting a preset fixed value Δrcs2 from the preceding value of the brake caliper pressure at the rear wheel in the full braking Pr2 is set as the current value Pr2 of brake caliper pressure at the rear wheel in the full braking (Pr2=the preceding value of Pr2−Δrcs2).

Next, in a step S113, it is determined whether the brake caliper pressure at the rear wheel in full braking Pr2 is equal to or below 0 or not. In the case where the result of the determination is "NO" (Pr2>0), the process proceeds to a step S116. In the case where the result of the determination is "YES" (Pr2≦0), the process proceeds to a step S114. Thereafter the brake caliper pressure at the rear wheel in the full braking Pr2 is set to zero. Further the process proceeds to a step S115, the timer is reset, and the process proceeds to the step S116.

In the step S116, it is determined whether the brake caliper pressure at the rear wheel in normal braking Pr1 is equal to or exceeds the brake caliper pressure at the rear wheel in full braking Pr2 or not.

In case the result of the determination in the step S116 is "YES" (Pr1≧Pr2), the process proceeds to a step S117, the brake caliper pressure at the rear wheel in normal braking Pr1 is set to a brake caliper desired pressure at the rear wheel Prt and the execution of this routine is at once finished.

In the case where the result of the determination in the step S116 is "NO" (Pr1<Pr2), the process proceeds to a step S118, the brake caliper pressure at the rear wheel in a full braking Pr2 is set to the brake caliper desired pressure at the rear wheel Prt, and the execution of this routine is at once finished.

As in a normal braking negated in the step S105, the brake caliper pressure at the rear wheel in a full braking Pr2 is set to zero in the step S106. It is substantially determined in the step S116 whether the brake caliper pressure at the rear wheel in a normal braking Pr1 is equal to or exceeds 0 or not. If the result of the determination is "YES", the process proceeds to the step S117, and the brake caliper pressure at the rear wheel in normal braking Prt is set to the brake caliper desired pressure at the rear wheel Prt.

In addition, if a full braking is affirmed in the step S105, the brake caliper pressure at the rear wheel in the full braking Pr2 is set to the brake caliper desired pressure at the rear wheel Prt by executing the steps S107 to S118 while the brake caliper pressure at the rear wheel in full braking Pr2 is larger than the brake caliper pressure at the rear wheel in a normal braking Pr1. However, when the brake caliper pressure at the rear wheel in full braking Pr2 is equal to or below the brake caliper pressure at the rear wheel in a normal braking Pr1, the brake caliper pressure at the rear wheel in a normal braking Pr1 is set to the brake caliper desired pressure at the rear wheel Prt.

Figure 4:
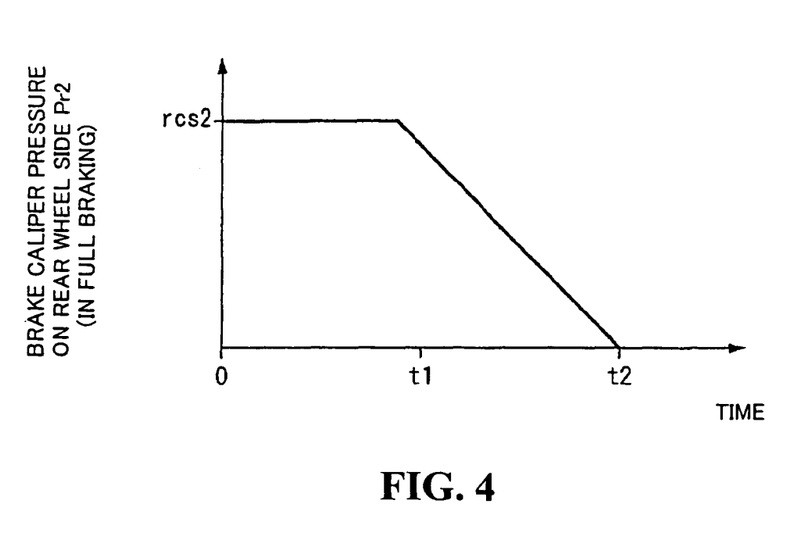
FIG. 4 shows one example of a second hydraulic pressure adjustment pattern in full braking in the embodiment.

FIG. 4 shows the temporal transition of the brake caliper pressure at the rear wheel in a full braking Pr2 set by executing the steps S107 to S115 and this becomes the second hydraulic pressure adjustment pattern. In the second hydraulic pressure adjustment pattern, until time t1 since a start, the brake caliper pressure at the rear wheel in a full braking Pr2 (an axis of an ordinate) is rcs2 that is fixed. Afterward, the brake caliper pressure at the rear wheel in a full braking Pr2 gradually decreases as time elapses. At the time t2 (for example, in one second since the start), the brake caliper pressure Pr2 becomes zero. As for a degree in the decrease of the brake caliper pressure at the rear wheel per unit time after the time t1, 1.6 to 3 MPa/sec are desirable. However, even if the degree is 0.5 MPa/sec, there is a sufficient effect.

Figure 6:
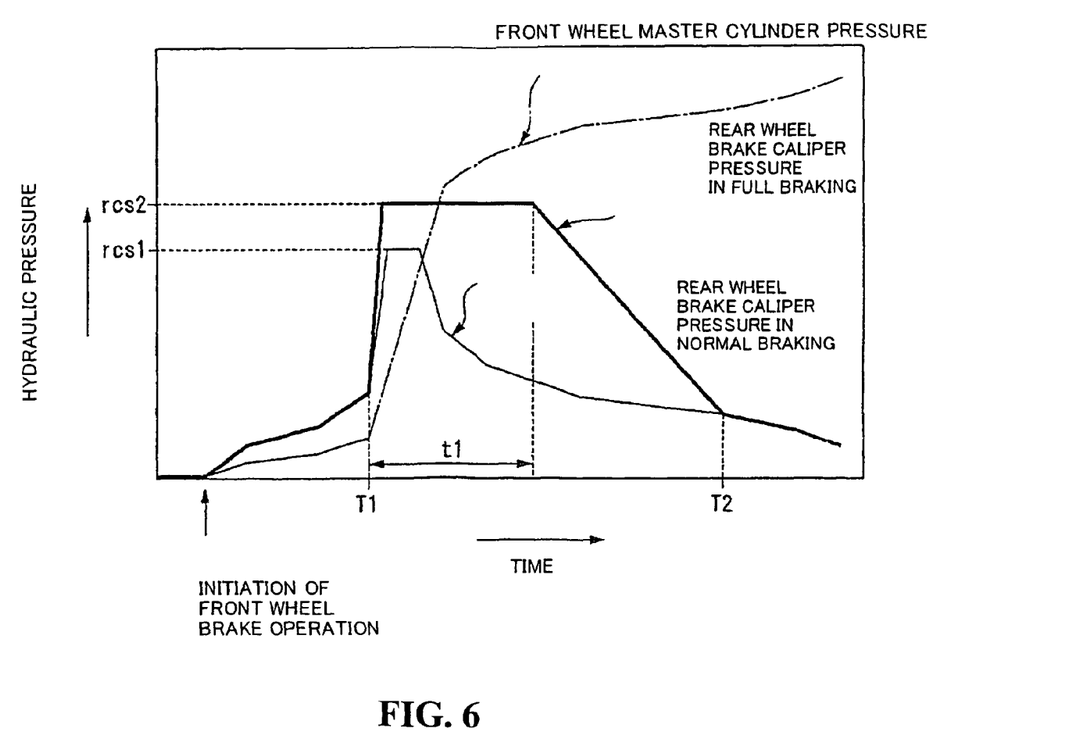
FIG. 6 shows a temporal transition of a brake caliper pressure of the rear wheel in the embodiment.

Referring to FIG. 6, one example of the temporal transition of the brake caliper pressure upon the rear wheel in CBS control will be described below.

In this example, when an increasing rate of the master cylinder pressure at the front wheel is started in a braking initial stage the braking operation at the front wheel is small. Thus, the brake caliper desired pressure of the rear wheel is set according to the hydraulic pressure adjustment map in a normal braking and the brake caliper pressure of the rear wheel (a thick full line in FIG. 6) gently rises in accordance with this.

When the brake lever 2 is fully operated by the rider at time T1, the master cylinder pressure at the front wheel abruptly increases. In the case when the increasing rate of the hydraulic pressure is equal to or exceeds a predetermined value (an increasing amount ΔPfm of the master cylinder pressure is equal to or exceeds the predetermined value S), and a hydraulic pressure adjustment map of the rear wheel is changed from the hydraulic pressure adjustment map in a normal braking to the hydraulic pressure adjustment map in the full braking. Thus, the brake caliper desired pressure Prt of the rear wheel is set, and the brake caliper pressure of the rear wheel is controlled so that it accords with the second hydraulic pressure adjustment pattern shown in FIG. 4. As a result, the brake caliper pressure of the rear wheel is abruptly increased up to an upper limit rcs2 immediately after the time T1 and is held at the upper limit rcs2 until time t1 elapses.

In FIG. 6, a thin line shows a brake caliper pressure in the case where it is supposed that the brake caliper pressure at the rear wheel is also controlled based upon the hydraulic pressure adjustment map in a normal braking when the increasing rate of master cylinder pressure at the front wheel is equal to or exceeds the predetermined value. That is, in a full braking, the brake caliper pressure at the rear wheel can be increased, compared with that in normal braking.

After the time t1 elapses since full braking is started, the brake caliper pressure at the rear wheel gradually decreases. When the brake caliper pressure at the rear wheel decreases up to a brake caliper pressure at the rear wheel when it is set based upon the hydraulic pressure adjustment map in a normal braking (T2), the brake caliper pressure at the rear wheel is thereafter controlled according to the hydraulic pressure adjustment map in a normal braking.

As described above, as the brake caliper desired pressure Prt upon the rear wheel is set according to the second hydraulic pressure adjustment pattern shown in FIG. 4 when it is estimated that the relatively great decrease of a vertical load onto a road surface of the rear wheel often occurs because the increasing rate of master cylinder pressure at the front wheel is equal to or exceeds the predetermined value, the brake caliper pressure at the rear wheel can be abruptly increased in time for the abrupt increase of the master cylinder pressure at the front wheel and as a result a large braking force can be also produced at the rear wheel in time for the increase of braking force at the front wheel.

As a suspension at the rear wheel can be made to go down by the braking at the rear wheel, the relatively great decrease of a vertical load onto a road surface of the rear wheel can be inhibited. Therefore, a brake feel is enhanced.

The invention is not limited to the above-mentioned embodiment.

In the above-mentioned embodiment, the braking device of the brake-by-wire type provided with ABS and CBS has been described. However, ABS is not necessarily required to be provided.

In addition, in the above-mentioned embodiment, the example in which the invention is applied to the braking device of the brake-by-wire type in which the brake mechanisms of the front and rear wheels are independent has been described. However, the invention can be also applied to a braking device of a type that includes a non-brake-by-wire method in which the input side and the output side are made to communicate in respective circuits of front and rear wheels and hydraulic pressure produced on the input side is supplied to a brake caliper (wheel braking means) on the output side so as to produce braking force is selected while the CBS control is not executed and a brake-by-wire method in which the input side and the output side are disconnected is selected while CBS control is executed.

A full braking judging means that judges that the rider fully applies the brake at the front wheel (braking operation which causes the rise of hydraulic pressure equal to or exceeding a predetermined level) is provided to the braking device. When the full braking judging means judges that full braking is currently applied, the controller 20 changes the level of a pressure intensification characteristic of the brake caliper 4 (the pressure intensification characteristic of the brake caliper 4 corresponding to the intensified pressure of the master cylinder 3) to a higher level and controls the hydraulic pressure modulator 6 (the electric motor 23) so that the brake caliper 4 is activated according to the changed pressure intensification characteristic. In the case of this braking device, when full braking is applied, a slip of the front wheel is generated by changing the level of the pressure intensification characteristic of the brake caliper 4 to a higher level as described above.

Figure 7:
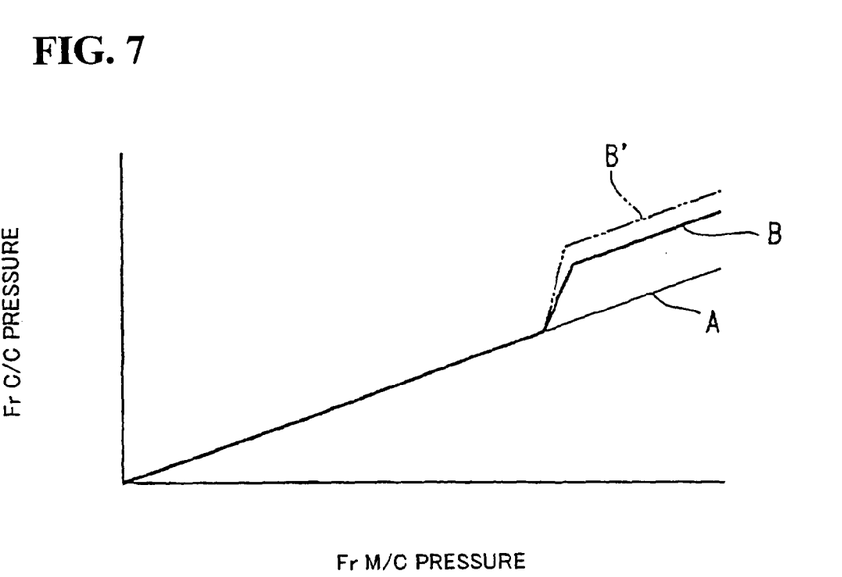
FIG. 7 shows a pressure intensification characteristic of a brake caliper in the embodiment.

"A" in FIG. 7 shows a basic pressure intensification characteristic of the brake caliper 4 in normal braking (hereinafter called only a basic pressure intensification characteristic) and B and B' in FIG. 7 show a pressure intensification characteristic changed to a higher level in a full braking (hereinafter called a pressure intensification characteristic in full braking).

In this embodiment, as for the pressure intensification characteristic in a full braking, a degree (see B and B' in FIG. 7) of a shift to a higher level is suitably changed depending upon conditions such as the operational speed of the braking member 2 by the rider and the estimated vehicle speed. The full braking judging means is configured by the pressure sensor on the input side 28, the pressure sensor on the output side 29 and the controller 20.

Figure 8:
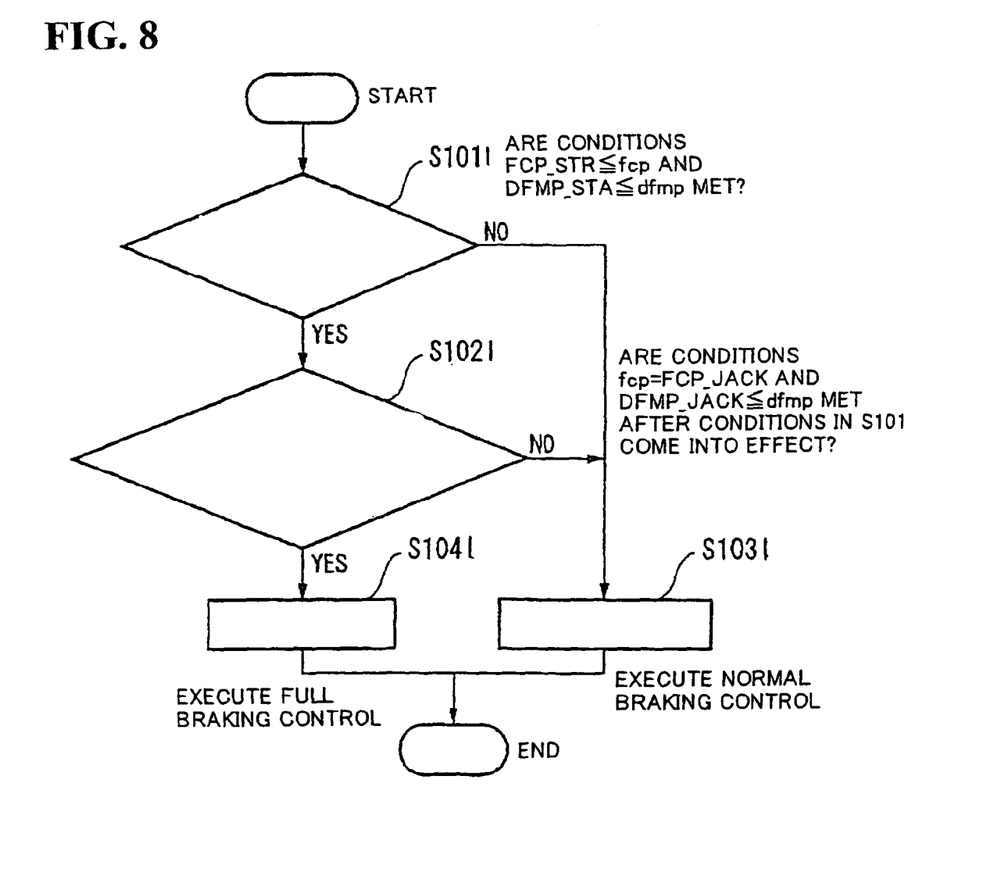
FIG. 8 is a flowchart showing a process for determining full braking in the embodiment.

Referring to flowcharts shown in FIGS. 8 and 9, the judgment by the controller 20 of full braking and concrete control by the controller over the hydraulic pressure modulator 6 in full braking will be described below.

In a judgment process for full braking, in step S1011 shown in FIG. 8, it is judged whether the conditions described in the following (1) and (2) are simultaneously met or not, in case the conditions are not met, it is judged that full braking is not applied, normal control over braking is made to be the basic pressure intensification characteristic shown by A in FIG. 7, and in case the conditions are met, the process proceeds to the next step S1021.

a. A variable fcp showing a hydraulic pressure detection value of the brake caliper 4 (a caliper cylinder C/C) at the front wheel is equal to or exceeds first reference hydraulic pressure FCP_STR.

b. A variable dfmp showing the hydraulic pressure rate of a change of the master cylinder 3 is equal to or exceeds a reference hydraulic pressure rate of a change DFMP_STA.

In step S1021, when the variable fcp of brake caliper pressure is equal to a second reference hydraulic pressure FCP_JACK that is larger than the first reference hydraulic pressure FCP_STR after the conditions (1) and (2) are met, it is judged that the following condition (3) is met or not. In the case when condition (3) is not met, it is judged that full braking is not applied and normal control over braking is made to be the basic pressure amplification characteristic shown by A in FIG. 7. In the case when the condition (3) is met, it is judged that full braking is applied and control over full braking is made to be the pressure intensification characteristic in full braking shown by B or B' (B and B' show representative examples) in FIG. 7 (the process proceeds to the flowchart shown in FIG. 9).

(3) The variable dfmp showing the hydraulic pressure rate of a change of the master cylinder 3 is equal to or exceeds the second reference hydraulic pressure rate of a change DFMP_JACK.

Figure 9:
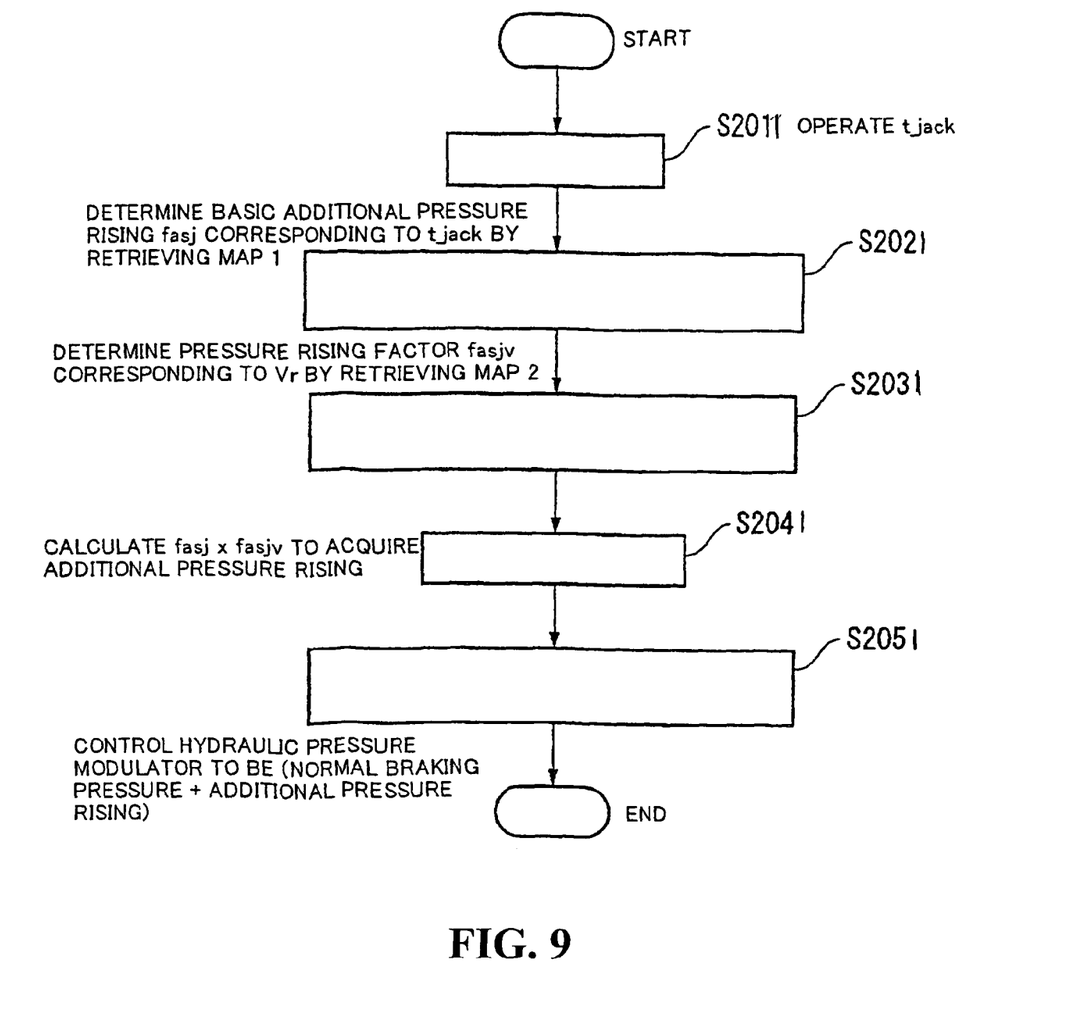
FIG. 9 is a flowchart showing full braking control in the embodiment.

In control over full braking, in step S2011 shown in FIG. 9, the elapsed time t_jack until the condition (3) shown in step S1021 is met after the conditions (1) and (2) shown in step S1011 in the former flowchart are met is operated. In the next step S2021, referring to a map 1 stored in a storage of the controller 20 beforehand and shown in FIG. 10, a basic additional pressure rising value fasj corresponding to the elapsed time t_jack is determined.

Figure 10:
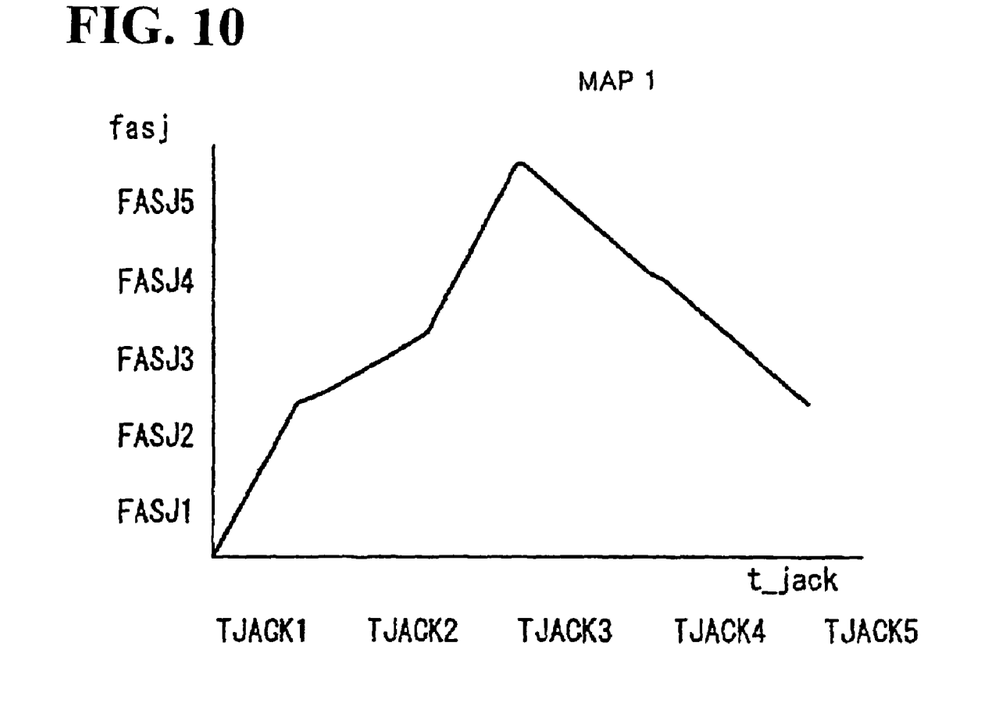
FIG. 10 shows a map defining relation between elapsed time t_jack and a basic additional pressure rising value fasj in the embodiment.

The map 1 shown in FIG. 10 and defining the relationship between the elapsed time t_jack and the basic additional pressure rising value fasj is shown to set an optimum basic additional pressure rising value fasj according to a situation of full braking.

Figure 11:
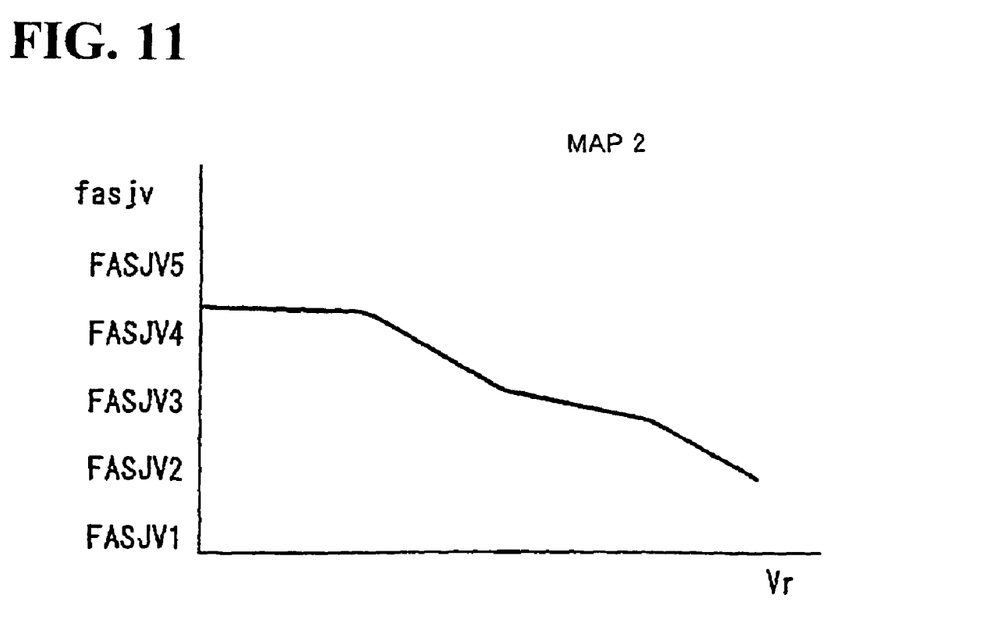
FIG. 11 shows a map defining the relation between estimated vehicle speed Vr and a correction factor fasjv in the embodiment.

In step S2031, referring to a map 2 stored in the controller 20 beforehand and shown in FIG. 11, a correction factor fasjv corresponding to an estimated vehicle speed Vr is determined.

The relationship defined in the map 2 shown in FIG. 11 between the estimated vehicle speed Vr and the correction factor fasjv is determined, considering that for example, if estimated vehicle speed Vr is accelerated, a slip of the wheel is easily generated in braking without increasing an additional pressure rising.

Afterward, in step S2041, an additional pressure rising value is operated based upon the basic additional pressure rising value fasj and the correction factor fasjv. In the next step S2051, the hydraulic pressure modulator 6 (the electric motor 23) is controlled to be hydraulic pressure acquired by adding the additional pressure rising value acquired in S2041 to a normal braking pressure acquired according to the basic pressure intensification characteristic.

In the case of this braking device, as the level of the pressure intensification characteristic of the brake caliper 4 at the front wheel is changed to a higher level when the above-mentioned control is made after full braking is applied at the front wheel, a slip of the front wheel is positively made by abruptly changing the braking pressure at the front wheel after the operation by the rider of full braking is started. Thus, the deterioration of a contact state of the front wheel and the decrease of a vertical load of the rear wheel are temporarily held back and the further decrease of the vertical load of the rear wheel is prevented. In the case when the slip generated at this time of the front wheel is large, optimum braking performance is secured by operating ABS.

In addition, as the braking device equivalent to this embodiment is provided with the pressure sensor on the input side 28 for sensing the hydraulic pressure of the master cylinder 3 and the pressure sensor on the output side 29 for sensing the hydraulic pressure of the brake caliper 4 and the feedback control of the hydraulic pressure modulator 6 in braking and the judgment of whether full braking is applied or not are made by using these two pressure sensors 28, 29, the precision of the control over the braking can be enhanced and a precise judgment of full braking is enabled. In the control by ABS, the precision of the control can be also enhanced by using the pressure sensor on the output side 29.

The invention is not limited to the above-mentioned embodiment and the various changes of design are allowed in a range which does not deviate from the object. The embodiment of the motorcycle adopting CBS together with ABS has been described, however, CBS is not necessarily required to be adopted and ABS has only to be adopted at least at the front wheel.

In the above-mentioned embodiment, the brake-by-wire method is adopted in which hydraulic pressure is produced in the hydraulic pressure modulator 6 based upon a value sensed by the pressure sensor on the input side 28 and is supplied to the brake caliper 4. However, the invention can be also similarly applied to a braking device according to a method of making the hydraulic pressure of a master cylinder directly act upon a brake caliper if only an actuator that additionally intensifies pressure when full braking is applied is added.

Next, referring to a flowchart shown in FIG. 12, a process for selecting the hydraulic pressure adjustment map will be described.

Figure 12:
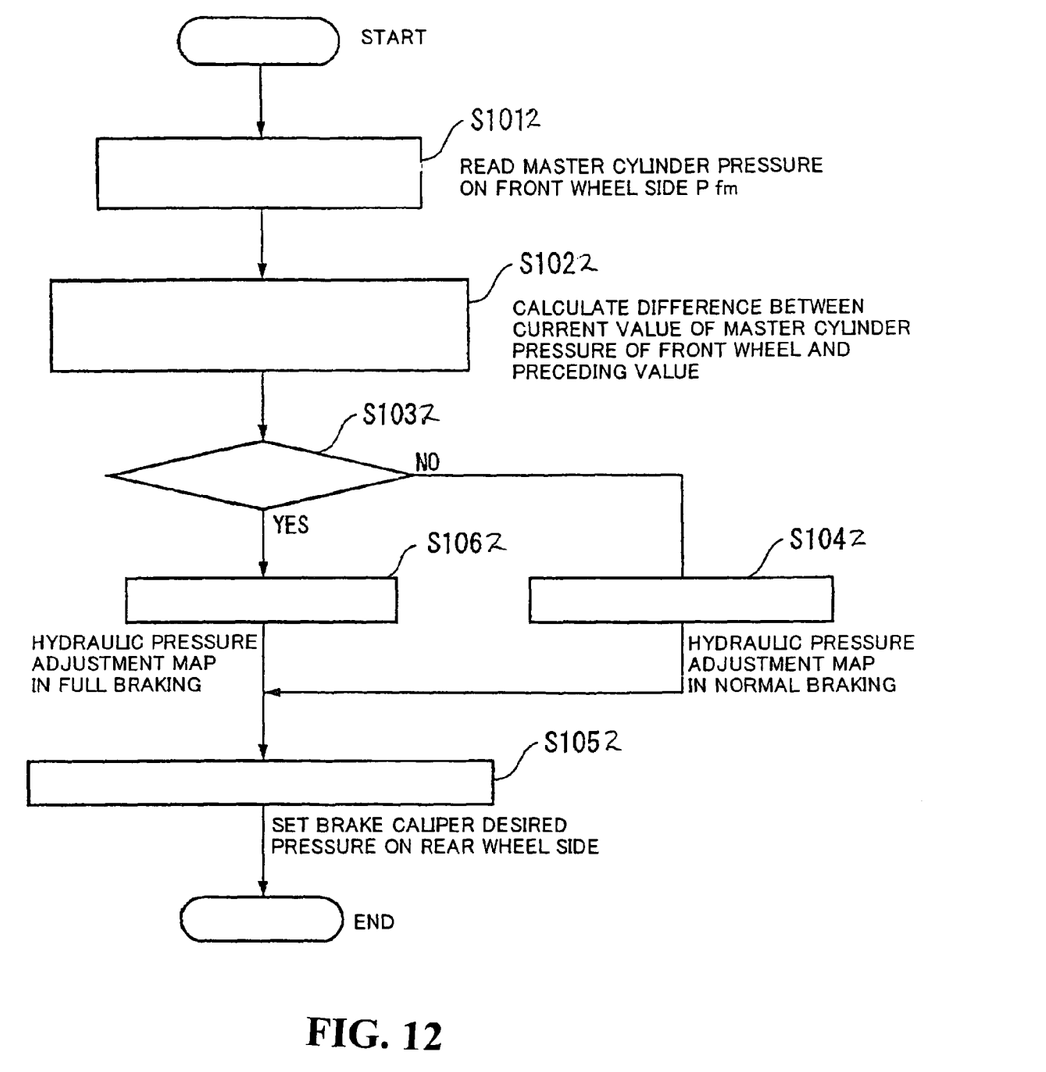
FIG. 12 is a flowchart showing a hydraulic pressure adjustment map selecting process in the embodiment.

A hydraulic pressure adjustment map selecting process routine shown in the flowchart in FIG. 12 is repeatedly executed by the controller 20.

First, in a step S1012, a value sensed by the pressure sensor on the input side 28 in the braking circuit 1*a* at the front wheel (that is, the master cylinder pressure at the front wheel) P fm is read.

Next, in a step S1022, the difference (hereinafter called a master cylinder pressure increasing amount) ΔP fm between the current value P fm by the pressure sensor on the input side 28 and the preceding value P fm$_{-n}$ is calculated (ΔP fm=P fm−P fm$_{-n}$). In this case, the preceding value P fm$_{-n}$ sensed by the pressure sensor on the input side 28 may also be a value P fm$_{-1}$ (that is, the preceding sensed value) read when this control routine is precedently executed and sensed by the pressure sensor on the input side 28, it may also be a further precedently sensed value P fm$_{-2}$, and may also be a furthermore precedently sensed value P fm$_{-3}$. The master cylinder pressure increasing amount ΔP fm corresponds to the increasing rate of master cylinder pressure at the front wheel.

Next, in a step S1032, it is determined whether the master cylinder pressure increasing amount ΔP fm is equal to or exceeds a predetermined value S or not. The predetermined value S is a positive value.

As the increasing rate of the master cylinder pressure at the front wheel is smaller than the predetermined value in the case the result of the determination in the step S1032 is "NO" (ΔP fm<S), the process proceeds to a step S1042, and the hydraulic pressure adjustment map in a normal braking is selected. Further in a step S1052, a brake caliper desired pressure at the rear wheel is set based upon the hydraulic pressure adjustment map in a normal braking, and the execution of this routine is finished at once.

In the meantime, as the increasing rate of the master cylinder pressure at the front wheel is larger than the predetermined value in the case when the result of the determination in the step S1032 is "YES" (ΔP fm≧S), the hydraulic pressure adjustment map in full braking is selected in a step S1062. Further in the step S1052, the brake caliper desired pressure at the rear wheel is set based upon the hydraulic pressure adjustment map in full braking, and the execution of this routine is finished at once.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A braking device for a motorcycle in which hydraulic pressure supplied to a wheel braking means at the rear wheel is adjusted according to hydraulic pressure at the front wheel produced by a brake operation at the front wheel, wherein:

a first pressure sensor senses hydraulic pressure at the front wheel produced by a brake operation at the front wheel;

a second pressure sensor senses hydraulic pressure supplied to a wheel braking means at the front wheel;

a third pressure sensor senses hydraulic pressure supplied to a wheel braking means at the rear wheel;

a controller effects control of a hydraulic modulator that determines the value of hydraulic pressure at the rear wheel, based upon (1) pressure sensed by the first and third pressure sensors and (2) a hydraulic pressure map selected from hydraulic pressure maps stored in the controller; and wherein the hydraulic pressure at the rear wheel is controlled according to a temporal increasing rate of the hydraulic pressure at the front wheel;

the selected hydraulic pressure map is different between (1) a case when the temporal increasing rate of the hydraulic pressure at the front wheel is equal to or exceeds a predetermined value and (2) a case when the temporal increasing rate is below the predetermined value; and more particularly hydraulic pressure at the rear wheel is set larger for a case when the temporal increasing rate of the hydraulic pressure at the front wheel is equal to or exceeds the predetermined value than for a case when the temporal increasing rate is below the predetermined value.

2. The braking device for a motorcycle according to claim 1, wherein the hydraulic pressure map selected when the temporal increasing rate is equal to or exceeds the predetermined value is determined according to elapsed time after the temporal increasing rate reaches the predetermined value; and wherein at first, the hydraulic pressure at the rear wheel abruptly increases;

afterward, the hydraulic pressure at the rear wheel becomes a substantially fixed value; and then the hydraulic pressure at the rear wheel gradually decreases.

3. The braking device for a motorcycle according to claim 1, wherein the hydraulic pressure map selected when the temporal increasing rate of the hydraulic pressure at the front wheel is below the predetermined value causes hydraulic pressure at the rear wheel to (1) increase when the hydraulic pressure at the front wheel is small, (2) become fixed when the hydraulic pressure at the front wheel is at a middle level and (3) gradually decrease when the hydraulic pressure at the front wheel is large.

4. The braking device for a motorcycle according to claim 1, wherein, for a hydraulic pressure map employed when the temporal increasing rate of the hydraulic pressure at the front wheel is equal to or exceeds the predetermined value, a fixed value is set that is larger than the substantially fixed value.

5. The braking device for a motorcycle according to claim 4, wherein a hydraulic pressure value retrieved based upon the hydraulic pressure map gradually decreases after a predetermined time elapses.

6. The braking device for a motorcycle according to claim 5, wherein
a hydraulic pressure value employed when the temporal increasing rate of the hydraulic pressure at the front wheel is equal to or exceeds the predetermined value and a hydraulic pressure value employed when the temporal increasing rate is below the predetermined value are compared; and
the larger hydraulic pressure value is set as a hydraulic pressure value at the rear wheel.

7. A braking device for a motorcycle provided with an input state detecting means for detecting the behavior of a braking member at a front wheel and a hydraulic pressure modulator for producing hydraulic pressure according to a detection signal from the input state detecting means and applying the hydraulic pressure to wheel braking means at the front wheel, comprising:
a master cylinder for producing hydraulic pressure according to a manipulated variable of a braking member;
a pressure sensor on an input side for sensing the hydraulic pressure of the master cylinder; and
a pressure sensor on an output side for sensing the hydraulic pressure of wheel braking means at a front wheel; and wherein
in braking, feedback control is applied to the hydraulic pressure of the hydraulic pressure modulator based upon signals from the pressure sensor on the input side and the pressure sensor on the output side;
full braking judging means for judging whether a rider fully applies, or does not fully apply the brake at the front wheel based upon the behavior of the braking member at the front wheel, the full braking judging means judging whether full braking is, or is not applied based upon the rate of a change of master cylinder pressure acquired based upon a value sensed by the pressure sensor on the input side and a value sensed by the pressure sensor on the output side;
wherein when the full braking judging means judges that full braking is applied by the rider, the full braking judging means increases hydraulic pressure produced by the hydraulic pressure modulator according to a detection signal from the input state detecting means and changes a pressure intensification characteristic of the wheel braking means at the front wheel.

8. The braking device for a motorcycle according to claim 7, wherein hydraulic pressure to be applied to wheel braking means at the front wheel from the hydraulic pressure modulator is electrically controlled based upon a detection signal of the input state detecting means.

9. The braking device for a motorcycle according to claim 7, wherein a state of a slip of a front wheel is detected and wheel braking means at the front wheel is controlled by ABS.

10. The braking device for a motorcycle according to claim 8, wherein a state of a slip of a front wheel is detected and wheel braking means at the front wheel is controlled by ABS.

11. A braking device for a motorcycle in which hydraulic pressure supplied to a wheel braking means at the rear wheel is adjusted according to hydraulic pressure at the front wheel produced by a brake operation at the front wheel, comprising:
a controller that (1) ascertains a value of a temporal increasing rate of the hydraulic pressure at the front wheel produced by brake operation at the front wheel, (2) stores control schemes for adjusting hydraulic pressure and (3) effects control of the hydraulic pressure at the rear wheel according to the value of the temporal increasing rate of the hydraulic pressure at the front wheel; and wherein
the controller effects (1) a first control scheme for adjusting the hydraulic pressure at the rear wheel when the value of the temporal increasing rate of the hydraulic pressure at the front wheel is equal to or exceeds a predetermined value and (2) another control scheme for adjusting the hydraulic pressure at the rear wheel when the value of the temporal increasing rate is below the predetermined value.

12. The braking device for a motorcycle according to claim 11, wherein, in the first control scheme, a larger hydraulic pressure at the rear wheel is set than for a case when the temporal increasing rate is below the predetermined value.

* * * * *